United States Patent [19]

Hummel, Jr. et al.

[11] 4,004,612
[45] Jan. 25, 1977

[54] REMOTE CONTROL FOR LARGE-AREA SPRINKLER SYSTEMS

[76] Inventors: Frank Hummel, Jr., 817-14th St., Greeley, Colo. 80631; Edmond B. King, Box 1781, Boulder, Colo. 80302

[22] Filed: Apr. 28, 1975

[21] Appl. No.: 572,104

[52] U.S. Cl. .......................... 137/624.11; 251/30; 251/137; 137/625.64; 239/69
[51] Int. Cl.² .................................... A01G 25/16
[58] Field of Search ............. 137/625.64, 624.11, 137/624.18, 624.2; 239/69, 70, 66; 251/137, 30

[56] References Cited
UNITED STATES PATENTS

| | | | |
|---|---|---|---|
| 3,412,971 | 11/1968 | McDivitt | 251/137 |
| 3,898,997 | 8/1975 | Kelley | 251/30 X |
| 3,911,955 | 10/1975 | Link | 137/624.2 |

*Primary Examiner*—Alan Cohan
*Attorney, Agent, or Firm*—Van Valkenburgh and Lowe

[57] ABSTRACT

A remote control for a large-area sprinkler system, where the sprinklers are to be operated in a sequential manner according to a specified program. The sprinklers are hydraulically operated and are controlled by a four-way latch valve whose piston, or core, will shift to either a sprinkler-open state or a sprinkler-closed state, the shifting being by energizing opposing solenoids.

The electrical system to power the solenoids is a low voltage - low amperage control circuit permitting the use of small diameter wires to be extended from a central power supply source for substantial distances therefrom and to each sprinkler. A capacitor in the circuit adjacent to latch valves builds up a charge sufficient for one of the solenoids to be energized to shift the latch valve to either open or close the sprinkler. Each solenoid is connected in the circuit by a connective lead which includes an electronic gate such as an NPN transistor which will normally prevent a flow of current through the lead but which may receive a signal voltage, as at the base of the transistor to permit current to flow, as from the capacitor to the solenoid.

The signal voltage need not be large, and the current thereby generated very small; hence, very small diameter wire leads can be used to signal the gate even though they may be extended for long distances from a control station. Preferably, however, an AC coded signal can be superimposed upon the control circuit which can be picked up by a discriminator at a selected sprinkler to signal the proper gate at the sprinkler for off or on operation. This coded signal will thus permit any one of a large number of sprinklers to be selectively operated, and a computer can be used and programmed to control any selected operative sequence for the sprinklers.

10 Claims, 11 Drawing Figures

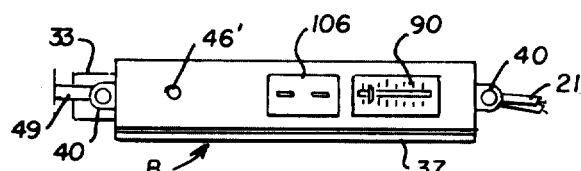
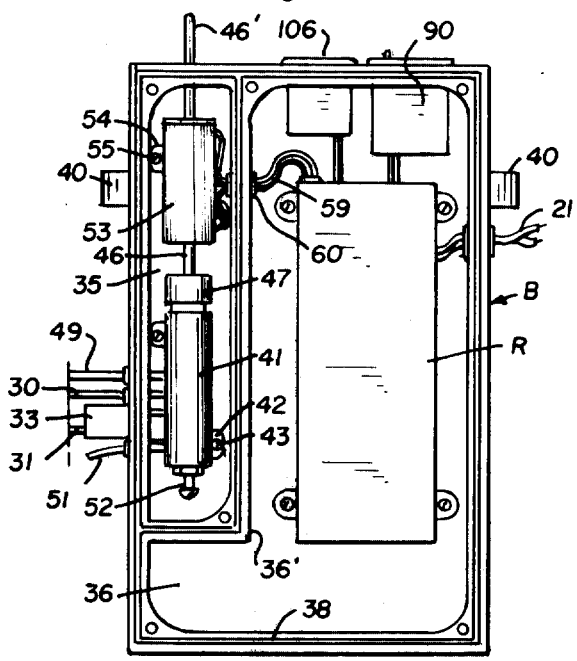
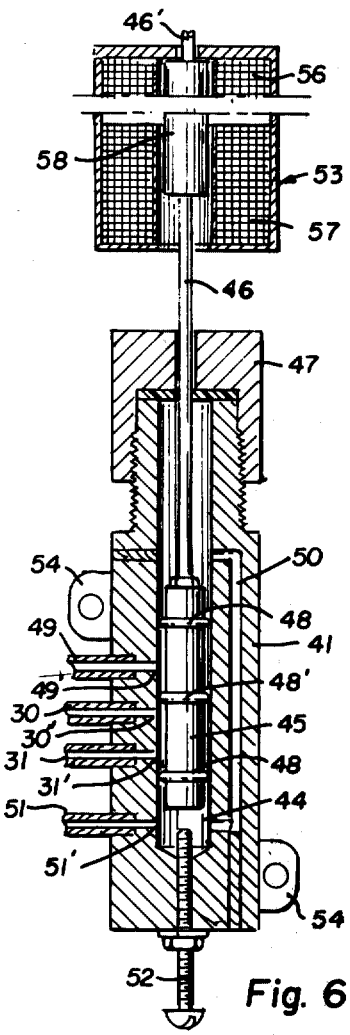
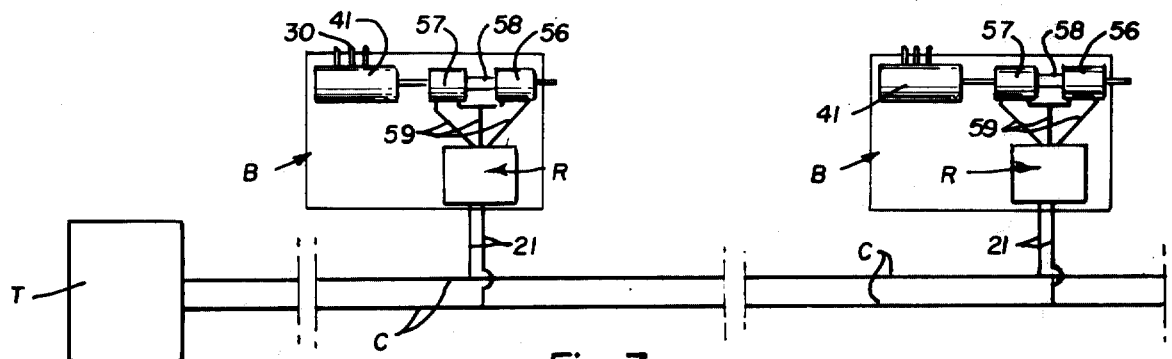
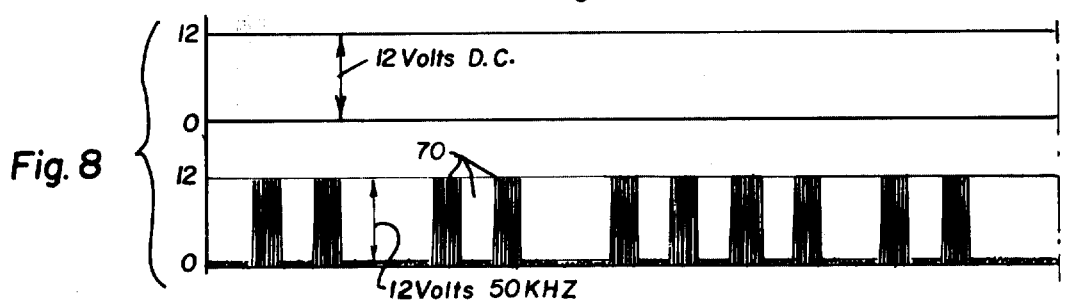

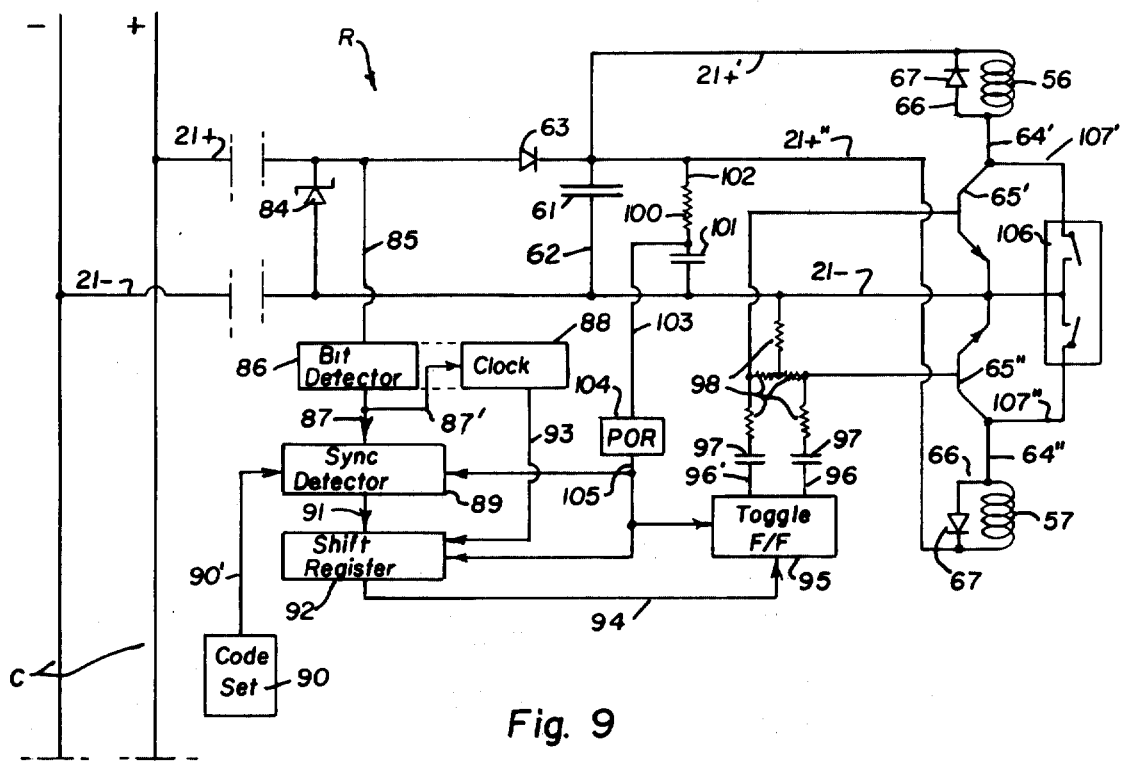
Fig. 9
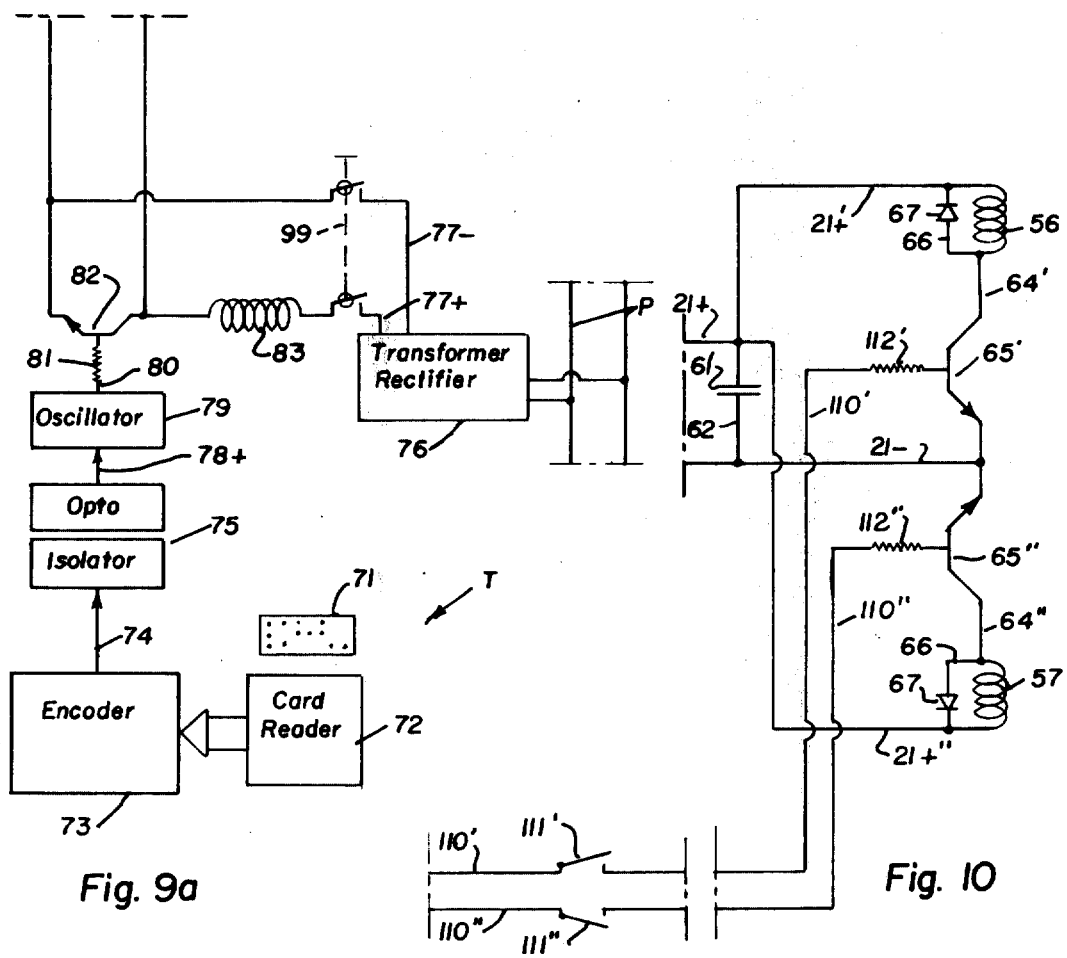
Fig. 9a
Fig. 10

REMOTE CONTROL FOR LARGE-AREA SPRINKLER SYSTEMS

The present invention relates to sprinkler systems, and more particularly to controls for sprinkler systems which selectively and sequentially direct the flow of water through the many sprinkler heads of a large sprinkler system.

The invention concerns controls for sprinkling systems using fixed sprinklers to irrigate large areas of land such as golf courses, parks and farms. Where a large number of sprinklers are spaced over a large land area, a simple, manual system involving turning valves on and off to operate the sprinklers becomes an exceedingly difficult, if not an impossible task. In such sprinkler systems, only a small number of sprinklers can be turned on at any one time; thus when irrigating the entire area, the sprinklers, or groups of sprinklers, must be turned on and then off in a sequential manner. Such a sequential operation of sprinklers is rendered necessary not only because the water supply is usually limited, but also because the pumps and water lines to the sprinklers cannot, as a practical matter, be made large enough to handle all of the sprinklers simultaneously.

It is desirable to sequentially operate the large number of sprinklers necessary to irrigate a large area at a central location and various control systems have been developed and perfected for this purpose. Some may be operated manually at the central location and others may be operated automatically using mechanical and electrical devices associated with the sprinklers, or with groups of sprinklers, to turn them on and off in sequence according to a selected program. The common automatic sprinkling systems using electrical control systems will include electrical circuit leads which extend to solenoid valves at the many sprinkler heads to turn on the individual sprinklers or to solenoid valves in branch lines to turn on the several sprinkler heads in each branch line. Whenever a solenoid valve is opened to turn on a sprinkler head, or sprinkler heads, it will be held open until sufficient water passes through the sprinkler head or sprinkler heads to properly irrigate the area under the sprinkler or sprinklers. This will require a sustained electrical current in the leads from the centrally located control to the sprinkler heads. It is thus essential that the large sprinkling systems, such as those found on a golf course, have a comparatively heavy and rugged electrical system to reach substantial distances necessary to operate the sprinkler heads remote from the centrally located control. Therefore, the larger the system and greater the distance from a central station to the various sprinkling heads, the more complicated and the more expensive an electrial control system becomes. The current required to hold an individual solenoid open during a sprinkling operation may not be large. However, when considering the possibility that several sections of a sprinkling system may be operating simultaneously and that the distances from the control box to the sprinklers may approach a mile or more, it is immediately apparent that the size of wire to sustain sufficient current, and the actual amount of wire needed in such a system becomes a serious problem, especially in view of the current copper shortage.

An important area of improvement thus resides in the endeavor to reduce the necessary size and number of electrical wires to control and to power the solenoid valves used in a sprinkling system.

The present invention was conceived and developed with the above and other considerations in view and it comprises, in essence, a sprinkler system powered and controlled by electrical power leads extending from a central station to individual sprinkler heads or branch line valves. The system is hydraulically operated through a master-slave arrangement. The sprinkler heads, or branch line valves, are hydraulically operated to become the slaves. The masters are comparatively small, solenoid-operated, latch-action valves, of a type which may be operated by electrical pulses. This permits the power leads to be very small wires, since a capacitor at each latch valve can be used to store a charge sufficient to produce an adequate electrical pulse even with a low line voltage. The charge can be pulsed by an electronic gate which requires an even smaller electrical signal. Such a signal can be carried over another small wire or even superimposed upon the power leads. Furthermore, a single pair of power leads may be connected in parallel with a large number of sprinkler heads which are to be operated sequentially. With this arrangement, the electronic pulsing gates of the latch valves can be operated individually, and according to a sequenced program, not only by providing an individual wire lead to each latch valve's electronic gate, but also, by transmitting the pulse signals over the power leads in a coded manner if individual wire leads are not used.

Such an arrangement permits the amount of copper needed for the wires in the system to be an absolute minimum and the system would require only a single wire if earth is used as a ground. However, a two-wire lead is preferred, for the size of the wires to be used for the system will be determined not so much by the size needed to carry the electrical current, but by the minimum size of electrical wires which are practical for the installers of the system to handle. Moreover, when two wires are used with a system which uses a low voltage, such as 12 volts, the problems which can arise with faulty insulation will be minimized. Even if the wires are buried underground and are accidentally stripped of portions of their insulation, there will be no significant loss of function unless, by accident, a direct short of the two lead wires were to occur.

Since the improved controls for a sprinkler system are adapted to operate sprinklers in a sequential manner at a low voltage, low amperage power supply, the system is capable of being regulated and programmed by a computer where the signals instructing an individual sprinkler to operate can be transmitted to the latch valve electronic gate of that sprinkler as by a binary code. The controls for the sprinkler system can use various types of computers which might vary from a simple arrangement to provide a signal sequence to the different sprinklers by manual directions, or by a programmed tape, or even by a more complex, fully automatic digital computor.

It follows that a primary object of the invention is to provide novel and improved controls for a sprinkler system, such that a large number of sprinklers can be operated in a selected, sequential manner.

Another object of the invention is to provide, in a sprinkler system, controls for operating individual sprinklers including electrical components which use a minimum possible amount of a small size copper wire to interconnect the several sprinklers with a central station.

Another object of the invention is to provide novel and improved electrically actuated controls for a sprinkler system which are capable of operating the system according to any selected plan or sequence, at a low voltage and with a minimal current load at any time.

Yet another object of the invention is to provide in a sprinkler system, electrically actuated controls which may be operated at a central station in various ways which could vary from a simple manual operation using contact switches to a sophisticated computer operation.

Other objects of the invention are to provide in electrically actuated controls for a sprinkler system, an arrangement of components which is simple, economical, reliable and requires a minimum of maintenance when being used in the field.

With the foregoing and other objects in view, the invention comprises certain constructions, combinations and arrangements of parts and elements as hereinafter described, defined in the appended claims and illustrated in the accompanying drawing, in which:

FIG. 4 is a plan view of the receiver box per se as taken from the indicated line 4—4 at FIG. 3.

FIG. 5 is a front elevational view of the control box but with its lid removed.

FIG. 6 is a longitudinal sectional view of a latching valve and solenoid shown at FIG. 5, but on an enlarged scale, and with portions of the solenoid broken away to conserve space.

FIG. 7 is a diagrammatic view showing, in block form, a transmitter, a pair of lines extending therefrom, and two sprinkler head receivers connected to the lines in parallel.

FIG. 8 is a graph to illustrate a 12 volt DC power supply.

FIG. 8a is a comparable graph to illustrate a 12 volt 50 KHz power supply which is modulated so that it can be used to transmit a binary code.

FIG. 9 is a circuit diagram of the electrical components to and within the receiver box.

FIG. 9a is a block-type circuit diagram to indicate the electrical components within the transmitter at the control station.

FIG. 10 is a fragment of a circuit diagram to depict another simplified embodiment of the invention.

Figure 1:
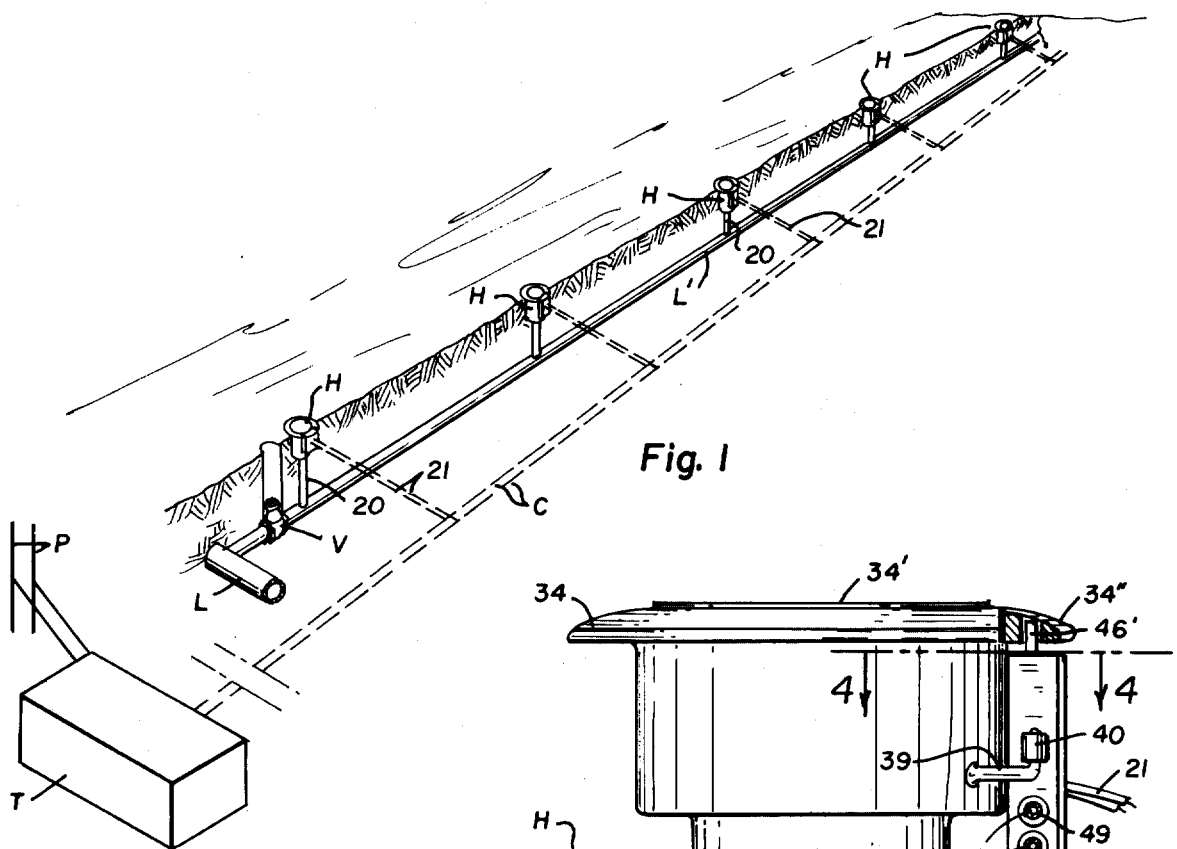
FIG. 1 is a diagrammatic view illustrating an underground waterline, a branch line extending therefrom with sprinklers upstanding from the branch line to extend to the ground surface and indicating further, in broken lines, electrical leads extending from a transmitter at a control station to each of the sprinklers.

Referring more particularly to the drawing, FIG. 1 illustrates in a somewhat diagrammatic manner a sprinkler system having individual operating heads in an arrangement which can advantageously use the invention. A fragment of an underground water supply line L is illustrated as having an underground branch line L' extending therefrom to carry a plurality of spaced sprinkler heads H mounted upon standpipes 20, upstanding from the branch line L' to place the top of each sprinkler head at ground level. The branch line L' will ordinarily include a control valve V adjacent to the main line so that the branch line may be turned off, if necessary. However, in normal operation of the sprinkler system as herein described, each head will turn off and on by suitable individual controls associated with the head itself, and in operation, the line control valve will remain open.

Commercial sprinkler heads are available which include control valves operated by line pressure as in the standpipe 20. For exammple, the Toro Irrigation Company located at Riverside, Calif., manufactures large area rotary sprinklers such as those identified as their 630, 650 and 680 series which are quite suitable for the purpose at hand. A sprinkler head of this type is hydraulically operated by an internal, piston-actuated valve and ordinarily, it is turned on and off by an auxiliary solenoid valve which directs a pressure flow to and from the piston in the sprinkler head. Such a sprinkler head may be easily modified to be used with the present invention which includes a selective electrical control and a latch-type hydraulic valve at each of the several heads of the sprinkler system.

The selective, electrically actuated controls for the sprinkler system, as herein disclosed, will include a central transmission station T which is connected to a suitable electrical power source P. The components within this central transmission station T, as hereinafter further described, are capable of transmitting sufficient power, preferably a 12 volt DC current to all of the sprinkler heads, as over a two-wire carrier line C, and also of transmitting signals to any selected sprinkler head over the same carrier line C. This carrier line C extends from the transmission station to lie alongside a group of sprinkler heads H, as illustrated, and the line C is connected to components within a receiver box B at each sprinkler head H as by leads 21. The carrier line C, even though of low voltage, is capable of operating a large number of individual sprinkler heads because the operation of an individual head is by a pulse of electrical current to open or close a latch valve and the energy for a pulse may be stored in a capacitor at the sprinkler head, as hereinafter described. Because of this, the carrier C may be a pair of very small diameter wires which are used to serve the dual purpose of providing power and carrying a message to instruct a sprinkler head to turn on or off. Thus, these wires are capable of providing sufficient additional power in the form of a signal to instruct an individual sprinkler head to turn on or off.

Before describing the components set forth in the preferred embodiment of the invention in further detail, it is to be noted that certain variations in the arrangements illustrated and described herein are possible without departing from the invention. For example, a single wire carrier might be used, as heretofore mentioned. Also, the several sprinkler heads on a branch line may be of a type which do not have any shut-off controls and remain open to operate together. Thus, the operation of the system is controlled at a branch line control valve V. This control valve V will be provided with an hydraulically operated, electrically actuated mechanism to open or close it and to operate with respect to other groups of valves on other branch lines in precisely the same manner as the apparatus herein described for individual sprinkler heads. Another variation resides in the use of individual small diameter wires to carry the instructions to each latch valve gate instead of using the carrier C for this purpose. The end results are essentially the same.

Figure 2:
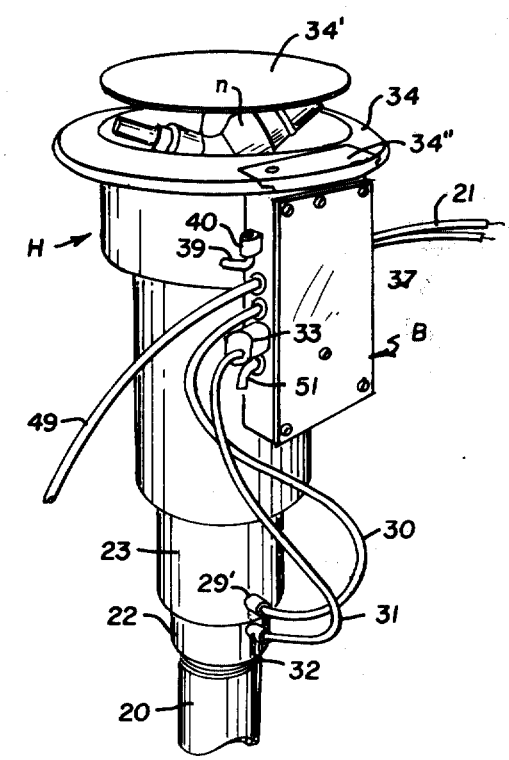
FIG. 2 is a perspective view of a single sprinkler head having its cover raised as during a sprinkling operation and having a receiving box mounted alongside the body of the sprinkler head wherein mechanisms and electrical components are located to control the operation of the sprinkler as hereinafter described.
Figure 3:
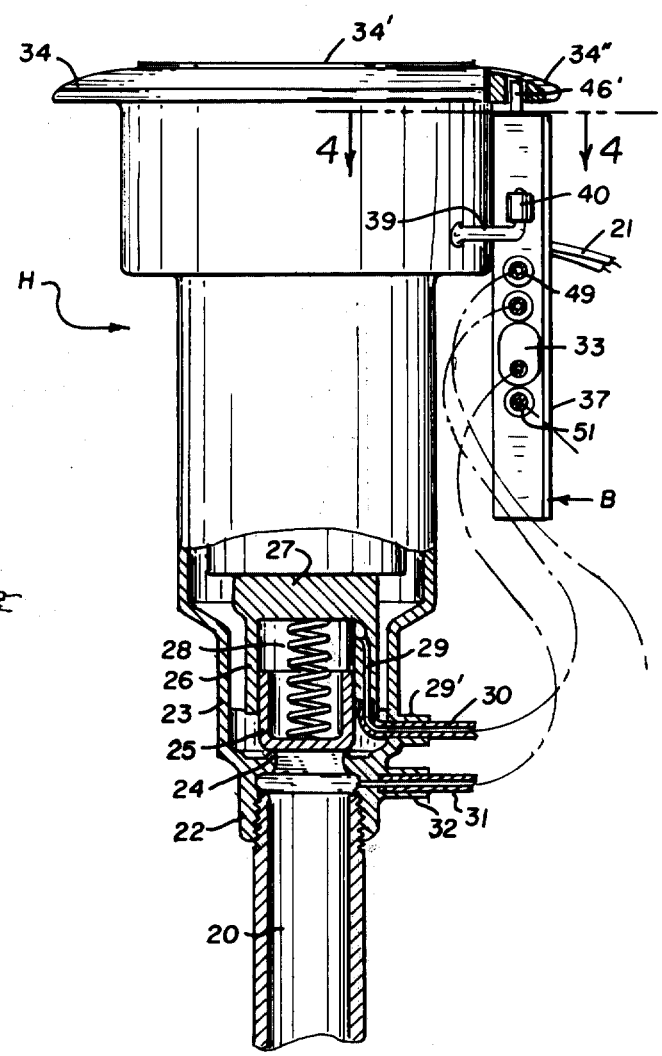
FIG. 3 is a side elevational view of the sprinkler shown at FIG. 2, but on an enlarged scale and with portions of the sprinkler head broken away to show the construction of a shut-off valve within it and with broken lines indicating the several flexible leads from the receiver box, to the sprinkler head and to discharge.

The conventional sprinkler head illustrated at FIGS. 2 and 3 is of a type which may be modified slightly to be used in conjunction with the improved control system. The sprinkler head H is an upright cylindrical member having various portions of its body varying in diameter. A threaded collar 22 is provided at its base to connect the head to the standpoint 20. The lower body portion of this head H, directly above the collar 22, constitutes a shut-off or valve section 23 enlarged in diameter to a degree sufficient to permit bypass of water from the standpipe 20 and into other portions of the sprinkler thereabove.

The valve parts include a circular seat 24 located at the base of the valve section 23, adjacent to the top of the collar 22. A cup-shaped, cylindrical piston, the valve 25, is telescopically carried in a downwardly directed cylindrical chamber 26 at the bottom of a core section 27 within the body of the sprinkler head H. This valve piston 25 has a diameter greater than the seat 24 and thus, it will move downwardly against the seat whenever the water pressure within the chamber is the same as the static pressure in the standpipe 20. A spring 28 within the chamber 26 urges this piston downwardly to supplement the hydrostatic pressure force. Water flows into and out of the chamber 26 through a suitable passageway 29 in the chamber wall and to the exterior of the sprinkler head to terminate as a stub 29' which is connected with a control line 30. The control line 30, in turn, extends to a latching valve within the receiver box B as hereinafter described. A pressure line 31 extends from a tube stub 32 at the side of the collar 22 below the valve 24 to also connect with the latching valve within the receiver box B to provide the necessary static pressure to hold the valve 25 against the seat whenever the two lines 30 and 31 are interconnected at the latching valve. A filter 33 is provided in this pressure line 31, preferably at the receiver box B, to prevent particles from plugging the lines.

The sprinkler head H will include conventional components above this valve section 23 which need not be described in detail. A motor is carried within the core section 27 to rotate sprinkler nozzles n which are lifted above a flange 34 at the top of the sprinkler head H, as illustrated at FIG. 2. The nozzles include a protective lid 34' which fits upon the flange 34 when the nozzles are retracted into the head.

The receiver box B is a flat, rectangular box which carries the mechanical and electrical components necessary for operation of the sprinkler head. Preferably, it will be formed with two chambers: a chamber 35 to house the aforementioned latching valve and a chamber 36 to house the electrical components. These chambers are closed and sealed from each other and from the exterior by a lid 37 which may be secured in place to fit against a gasket 38 about the edge of the container and on the partition between the chambers. This receiver box B is a small, compact unit and is preferably mounted in an upright position onto the body of the sprinkler head H as upon hooks 39. Lug sockets 40 on the sides of the box are provided for this purpose as illustrated at FIGS. 2 and 3. A removal portion 34'' of the sprinkler head flange 34 may be provided directly over this box B to permit it to be easily removed for inspection and maintenance purposes. In this connection, it is contemplated that the hydraulic lines 30 and 31 and the electrical lines 21 will be loosely fitted into a pocket of earth alongside the sprinkler head so that removal of the same will be an easy matter without disrupting these lines.

The aforementioned latching valve 41, as illustrated at FIGS. 5 and 6, is a spool type valve operated by a double acting solenoid hereinafter described. The valve 41 has a cylindrical body which may be mounted within the box chamber 35 by suitable mounting feet 42 being secured in place by screws 43. The valve body is formed as a cylindrical member having a cylindrical, cup-like cavity 44 within it which is open at one end. A piston 45 slidably fits in this cavity and an axial piston rod 46 extends therefrom and through a bonnet 47 over the open end of the cavity 44 to connect with the armature of a solenoid as hereinafter described. The piston 45 is divided into two sections by three O-rings 48 which slidably engage the walls of the cavity 43, to form two small chambers in the valve.

The control line 30, which extends from the sprinkler head H, terminates at the valve 41 to open into the valve cavity 44 near the center of the valve body. The position of this control line opening 30' into the valve is such that when the piston 45 shifts back and forth, the central O-ring 48' is shifted across the opening 30' to place the control line outlet in one or the other of the chambers formed by the O-rings 48. The pressure line 31, which extends from the standpipe 20, terminates as an opening 31' in the valve cavity 44 adjacent to the control line 30. The position of this pressure line opening is such that it will always be in one chamber between the center O-ring 48' and a side O-ring 48 regardless of the shifting movement of the piston 45. Thus, whenever the piston 45 is at the position shown in FIG. 6, the control line 30 and the pressure line 31 will be to the same chamber and water will flow from the pressure line 31 into the chamber and thence, into the control line 30, to move the sprinkler head valve 25 to a closed position against the seat 24.

a drain line 49 is positioned in the valve 41 adjacent to the control line 30 with its opening 49' into the valve cavity at the side opposite to the pressure line opening 31' and this drain line will be in the other chamber between the center O-ring 48' and the other side O-ring 48 regardless of th shifting movement of the piston 45. Thus, whenever the piston is at the position opposite from that shown at FIG. 6, the control line 30 connects with the drain line 49, relieving pressure within the sprinkler head valve 25 to permit this valve to open.

A passageway 50 is provided in this latch valve 41 which extends to the extremities of the cavity 44, at each side of the piston 45, and a leak drain 51, having an opening 51' at the lowermost end of the lower cavity, prevents any underbalanced pressure buildup which might occur by leakage past the O-rings. It follows that the hydraulic forces on this piston 45 are balanced regardless of its position and that it may be easily shifted from one position, to close the sprinkler head, to another position to open the sprinkler head. The only resistance to such movements is the drag of the O-rings 48 on the walls of the cavity 44. To limit one movement of the piston 45, a set screw 52 is provided at the bottom end of the latch valve body 41. The movement of the piston in the other direction is limited by a stop on the solenoid, as illustrated at FIG. 6 and hereinafter described. The position of the set screw 52 within the chamber 44 is such that the end of the piston will abut against the set screw when the control line 30 and the drain line 48 are interconnected.

This valve piston is operated by a double acting solenoid 53 which is formed as a thin-walled, tubular member and which is held in axial alignment with the latch valve 41. This solenoid may be held in place in the chamber by mounting feet 54 held in position by screws 55. The solenoid includes a coil at each end of this body, a closing coil 56 and an open coil 57. An armature 58 is a magnetically susceptible tubular rod which will shift between these coils. The piston rod 46 is connected to this armature 58, and preferably, it extends through the armature to be extended therebeyond as a stub 46' which projects through an opening in the box B, as best shown at FIG. 5. This stub 46' may be gripped when manual shifting of the piston 45 is necessary. Normally, however, movement of this armature 58, responsive to electrical pulses in the coils 56 and 57, will shift the piston 45 to either the on or off position. Electrical leads 59 extend from electrical components within the chamber portion 36, through the dividing wall 36' of this box B and to the solenoid coils 56 and 57. These leads 59, hereinafter further described, will include a sealing grommet 60 as this dividing wall 36'.

FIG. 7 shows an arrangement of the carrier wire C from the transverse station T to two receiver boxes B with the connecting leads 21 being in parallel. This arrangement is illustrative of the fact that the carrier can be extended to the boxes of a number of sprinkler heads to connect with the electrical components in the chamber 36 of each receiver box B. These electrical components in a receiver box B constitute the receiver R indicated at FIG. 5, and the circuitry within a receiver R is shown at FIG. 9. The basic voltage signal over the carrier is a DC voltage and hence, the leads 21 from the carrier C to the receiver are indicated at FIG. 9 by their polarity 21+ and 21−. Since the wires of the carrier C and of the leads 21+ and 21− are of a small diameter, as mentioned, a capacitor 61 is located in a lead 62 between the connector leads 21+ and 21− at each receiver R to provide a charge sufficient to operate either the closing coil 56 or the opening coil 57 of the solenoid. Since the carrier C and the connecting leads 21+ and 21− will also carry an alternating current to operate the receiver as hereinafter described, a diode 63 is located in the lead 21+ to prevent the capacitor 61 from being discharged.

The circuits from the leads 21+ and 21− to the solenoid coils are similar. The positive lead 21+ bifurcates into a branch lead 21+' which connects with one end of the closing coil 56 while the other branch lead 21+" connects with one end of the opening coil 57 and these leads 21+' and 21+" are part of the leads 59 heretofore mentioned. A lead 64' extends from the opposite end of the closing coil 56 to connect with the collector of an NPN transistor 65' to extend from the emitter thereof and connect with the main lead 21− to complete the circuit. The transistor 65' operating the closing coil 56 forms an electronic gate which, when turned on, permits a charge on the capacitor 61 to produce a pulse flow through the closing coil 56. A lead 66, having a diode 67, shunts the coil 56 as a suppressor.

The circuits from the opening coil 57 are similar. A lead 64" extends to the collector of an NPN transistor 65" and thence from the emitter to connect with the main lead 21−. Also, a lead 66 with a diode 67 shunts the coil 57 to function as a suppressor. It follows that whenever the transistor 65", functioning as a gate, turns on, a charge on the capacitor 61 produces a pulse flow through the opening coil 57.

The gate transistors 65' and 65" will turn on responsive to a small voltage and current to their respective bases which need not be more than one volt at 200 microamps. Accordingly, the carrier C can easily transmit sufficient electrical energy to do this in addition to providing the energy required for operating the solenoid coils 56 and 57.

The need for selective operation of any one of a group of sprinkler heads whose receivers are interconnected to a single carrier C requires that a coded signaling system be used so instructions may be issued from the central transmission station T to any one of the sprinkler heads remote from this station. This is accomplished with the apparatus illustrated at FIGS. 9 and 9a by use of an alternating current on the carrier C which is of the same voltage, 12 volts, as the D.C. current, and at a moderately high frequency, 50 KHZ being quite satisfactory for the purpose. Modulation of this alternating voltage can then be used for signaling the receivers.

FIG. 8 represents the basic power voltage, 12 volts D.C. on the carrier C, that is, the voltage difference being 12 volts between the carrier wires. FIG. 8a represents an alternating signal which may be imposed on the same carrier at the same voltage and which is modulated to provide data bits 70 of a binary code, a preferred mode of signaling the receivers. It is to be noted that the time factor for sending and receiving this binary code can be comparatively slow, for example a data bit can be one microsecond or even longer since a sprinkler may use several minutes in turning on or off and may remain on 30 minutes or more.

A basic program for operation of the system, turning on one sprinkler head at a time, requires an operator to select a sequence of sprinkler head operations and to specify the time each sprinkler head is to operate. Given these operator-defined parameters, a computer system located at the central transmission station T can use conventional components for the most part, and be programmed to comply with such parameters. Such a computer system is shown at FIG. 9a. The basic program, specifying the sequence and the timing for operation of each sprinkler can be coded on a punched card 71 which is fed to a conventional card reader 72 and thence to an encoder 73 to convert the instructions on the card reader to a binary code. Many card readers are available and need not be described further. A suitable encoder 73 for a normal group of sprinkler heads on a carrier is the NSC IMP-8, an 8-bit microprocessor manufactured by National Semiconductor Company at Santa Clara, Calif.

The binary output on a data bus lead 74 of this encoder will be at approximately 5 volts. This output lead extends to an opto-isolater 75 to protect the encoder from a voltage surge which might be impressed upon the carrier C. Opto-isolaters are commonly used for this purpose and a suitable unit for the purpose at hand is the unit identified as H.P. 4351, manufactured by Hetwett-Packard of Palo Alto, Calif.

The central transmission station T is powered by any suitable power source P, such as a 110 volt A.C. power supply. A transformer-rectifier 76 is used to provide power to the card reader 72, the encoder 73 and the opto-isolater 75 in a conventional manner which need not be shown. Also, the power source supplies, through 12 volt D.C. leads 77+ and 77−, power to the carrier C.

The output lead 78+ from the opto-isolater 75 connects with a line driver circuit to impose a 12 volt alternating current upon the carrier C to supplement the 12 volt D.C. power output from the leads 77. A 50 KHZ oscillator 79 connects with the lead 78 and the output of this oscillator extends as a lead 80 through a current limiting resistor 81 to the base of an NPN driver transistor 82 wit a 50 KHZ oscillator, which is a conventional unit. A 5000 ohm resistor 81 and a D40K1 type transistor, manufactured by General Electric Company of New York, are suitable for these components 81 and 82.

The positive power source lead 77+ extends through a choke coil 83, thence to the collector of the transistor 82 and also to the positive lead of the carrier C. The emitter of the transistor extends to the negative lead of the carrier C. The negative power source 77− also extends to the negative lead of the carrier C to complete the driver circuit. The choke coil 83 is tuned to resonate with the oscillator 79 and accordingly, operation is as follows: Whenever a 1 data bit is transmitted to the transistor base, through the oscillator and at 50 KHZ, the transistor opens and imposes zero volts on the carrier for the duration of the data bit. Whenever a 0 data bit is transmitted, the transistor turns off and the carrier is at 12 volts D.C. for the duration of the bit. This modulated signal is then tansmitted over the carrier to the receivers on the line.

The components at the receiver R, at a sprinkler head H, which receive this 12 volt signal, are conventional components, made up of selected integrated circuits of chips. A zener diode 84 across the connecting leads 21+ and 21− functions as a clamp to prevent an excess voltage across these leads. The input lead 85 of a bit detector 86 receives the modulated signal from the positive lead 21+ to provide a D.C. binary output at low voltage on an output lead 87. A branch lead 87' extends to a binary clock 88 to synchronize the receiver components with the rate of data bits being received, for example, as 1 millisecond per data bit. This bit detector 86 and clock 88 may be obtained in a common integrated circuit, for example, the NSC chip item MM74COON, manufactured by National Semi-Conductor, can be used.

The output lead 87 extends to a sync detector 89 which is set as by a code set 90 to receive a selected code from the carrier, and whenever the code is proper, the output is directed through a lead 91 to a shift register 92. The shift register is also controlled by the clock 88, through a lead 93, to operate in phase with the coded input. The sync detector 89 may be a NSC chip, item MM74C193N. The shift register may be a NSC chip, item DM74C165N. The code set 90 is an NSC item, commonly available.

The output of the shift register 92, a pulse, is extended on a lead 94 to a toggle 95, a flip-flop, which has its primary output lead 96 connected to the base of the opening transistor 65" and its complement lead 96' connected to the base of the closing transistor 65'. Capacitors 97 in these leads permit only a pulse to pass to the transistors. Whenever a voltage is imposed on the lead 96, no voltage is on lead 96' and the sprinkler head will open, as heretofore described. A second pulse through the shift register will reset the flip-flop to place a voltage on the complement lead 96' but no voltage on the lead 96 to close the sprinkler head, as heretofore described. A standard NSC chip, item MM74C74N can be used for this toggle.

The leads 96 and 96' may include a current limiting arrangement of resistors 98 to prevent an excess or a stray voltage from being imposed at the bases of transistors 65' and 65". The transistors 65' and 65" are a high gain type, such as item GED40C4 manufactured by General Electric.

The manual switch 99 can reset the entire system to an "off" state and other manual operations are possible, as with using the manual override circuits.

A circuit to turn all sprinkler heads off when the system is shut down or at any other time desired, uses a simple POR (power on reset) circuit arranged to pulse the other integrated circuits to set them to the off state whenever the power on the carrier C is shut off, as by opening a manually operated switch 99 at the central transmission station. This POR circuit includes a resistor 100 and a capacitor 101 in a lead 102 shunting the power supply of leads 21+ and 21−. A lead 103 extends from lead 102 to the POR chip 104. This integrated circuit may be an NCS item MM74CO4N, although only one-sixth of the chip is needed. The output lead 105 from the power on reset chip 104 extends to the sync detector 90, the shift register 92 and the toggle 94. Whenever power on the carrier is turned off, and then on again, all compounds in all sprinkler heads are at an initial off state.

To complete the apparatus at the receiver, a manual override receptacle 106 may be provided with leads 107' and 107" to the collector of each transistor 65' and 65". By selectively applying a ground to a lead 107' or 107", the sprinkler head can be opened or closed. A source for doing this will be provided externally from the system and connected into the receptacle 106 in a conventional manner. As a matter of convenience, this receptacle and the code set 90 may be separated from the other receiver components and be located at the top of the receiver box as indicated at FIGS. 4 and 5.

FIG. 10 illustrates another embodiment wherein the invention may be used, by use of individual leads extending to the bases of transistors 65' and 65" for purposes of turning a sprinkler head off or on. The D.C. circuits 21+ and 21− are the same as heretofore described and the circuit 21+ bifurcates to leads 21+' and 21+" to connect with the respective closing coil 56 and opening coil 57 of the solenoid. A capacitor 61 in lead 62 provides a pulse of power. Leads 64' and 64" extend from the coils 56 and 57 to extend to tansistors 65' and 65", respectively, and thence to the circuit lead 21−. Small wires 110' and 110" extend from the bases of the respective transistors 65' and 56" to the central transmission station T where switches 111' and 111" are located to turn on the respective transistors. The practical aspect of this arrangement resides in the fact that the wires 110' and 110" may be very small since only a minute current and voltage will be required; in fact, current limiting resistors such as 112' and 112" may be needed to curb the voltage on the transistors.

What is claimed is:

1. A low-voltage, low amperage remote control system for operating a valve, or the like, which is controlled at a control station remote from the valve, said valve being hydraulically actuated and opens and closes responsive to fluid flow directed through opposing passageways in the valve, said system comprising, in combination therewith:

a. a latch valve at a hydraulically actuated valve connected with the aforesaid opposing passageways, said latch valve being shifted to a first position to direct fluid through one passageway to open the valve and to a second position to direct fluid through the other passageway to close the valve, said latch valve remaining at the position to which it is shifted until shifted to the other position;

b. two opposing solenoid means associated with the latch valve with one solenoid means operable to shift the latch valve to said first position responsive to a charge of current through the solenoid means and the second solenoid means operable to shift the latch valve to said second position responsive to a charge of current through the solenoid;

c. direct current circuit means extended to each solenoid means including a charge-receiver means adjacent to the solenoid means to receive a charge, and a normally off electronic gate at each solenoid means to normally prevent flow of the charge from the charge-receiver means to the solenoid means; and d. control circuit means extended from each electronic gate to a selective switching means at the control station adapted to selectively turn the gate on, whereby the charge at the charge receiver means will then produce current through the solenoid means and shift the latch valve to the position directed by the solenoid means whenever the latch valve is at the opposite position.

2. The system defined in claim 1, wherein:
the charge receiver means is a capacitor;
each electronic gate is a transistor with the direct current circuit means extending through the collector and emitter branches thereof and thence to the proper solenoid means; and
wherein the control circuit means includes a lead extending to the base of the transistor whereby small changes in the voltage level of the control circuit means will turn the transistor on and off.

3. In the system defined in claim 2, wherein the control circuit means includes:
a wire extended from the lead at the transistor base to the switching means at the control station.

4. In the system defined in claim 3, wherein:
the direct current circuit means includes that portion of the aforesaid control circuit wire extending from the control station to a point near the valve, and another portion extending from that point to the capacitor and thence to each of said solenoid means and means to impose a direct current voltage thereon; and
the control circuit means includes an alternating current generating means at the control station connecting with the said wire and a discriminator means at the wire adjacent to but ahead of the capacitor adapted to receive the alternating current voltage, separate the same from the direct current voltage and rectify this separated alternating current to a direct current output connected to the base of a transistor gate.

5. The system defined in claim 4, wherein said discriminater means includes:
a rectifying means adjacent to the capacitor.

6. In the system defined in claim 4, including:
a code-producing, pulsating-control associated with the alternating current generator at the remote station which generates a coded sequence of alternating current pulses; and
decoding means at the discriminater adapted to respond to a given coded sequence of alternating current pulses to selectively energize the base of one or the other of the aforesaid electronic gates.

7. The system defined in claim 6, including:
a plurality of hydraulically actuated valves and valve controls at each valve, as hereinabove defined, wherein the valve controls are interconnected to the aforesaid wire leads in parallel, each having individualized discriminater means adapted to respond to a selected code sequence; and
a computer means at the code-producing pulsating-control adapted to selectively operate the hydraulically actuated valves responsive to selected code sequences.

8. The system defined in claim 1, wherein the latch valve comprises:
a cylinder having an elongate piston therein;
fluid inlets and outlets at the side of the cylinder within the embrace of the piston; and
O-ring seals about the piston associated with the fluid inlets and outlets to permit selected fluid passageways to be formed at the sides of the piston responsive to shifting of the same to various positions without creating significant unbalanced pressures on the piston.

9. The system defined in claim 1, wherein:
the charge receiver means includes a capacitor.

10. The system defined in claim 1, wherein:
said direct current circuit means and said control circuit means produce electrical currents and said currents are carried from the control station to the valve on a common wire; and
a discriminator means at the valve to separate the control circuit current from the direct current of the direct current circuit means.

* * * * *